Patented Jan. 10, 1950

2,494,320

UNITED STATES PATENT OFFICE 2,494,320

APPARATUS FOR OPERATING GAS TURBINE PLANTS

Walter Traupel, Winterthur, Switzerland, assignor to Sulzer Frères, Société Anonyme, Winterthur, Switzerland Application March 15, 1946, Serial No. 654,671
In Switzerland May 26, 1945

7 Claims. (Cl. 60—49)

This invention relates to a method of operating a semi-closed cycle gas turbine plant of the type which includes a compressor for supplying make-up air at superatmospheric pressures to replace working medium withdrawn from the plant, at least when the plant is operated at high load. A plant of the type dealt with by this invention is to be understood as including a circuit (which, in turn, includes a compressor, the heat transmitting side of a recuperator, a gas heater, a turbine driving the compressor, the heat absorbing side of the recuperator and conduits for leading a working medium through the recited elements in the order recited and back again to the compressor), means for extracting from that circuit a partial quantity of working medium and supplying it to the gas heater as combustion air, a precompressor for introducing into that circuit atmospheric air at a superatmospheric pressure as make-up for the working medium extracted, and at least two turbines driven by the combustion products from the gas heater, one producing plant useful output and the other driving the make-up compressor. Such a plant is illustrated and described on pages 84 (Fig. 11) and 85 of "Power" (McGraw-Hill) for October 1946. Such a plant may be briefly identified as a "semi-circuit" gas turbine plant.

The method of the invention is characterized in that the desired value of the pressure at one part of the circuit and its relation to the pressure of the make-up air is adjusted in accordance with the load. This method is especially suited for use in plants for propelling warships. Such plants are required to work continuously at a very high efficiency at cruising speed, and to be able to develop a multiple of that normal output in forced service, still at a good efficiency.

In order to be able to fulfill these demands which are in conflict with each other, the pressures in the plant may not simply be allowed to adjust themselves; they would then change at all places approximately in proportion to the load. To meet the specified conditions, it is essential to bring the pressures to predetermined ratios to each other in accordance with the load. For example, the ratio of the pressure in the circuit to the pressure of the make-up air should preferably be increased with increasing load.

A gas turbine plant suitable for carrying out the method of the invention must have a turbine, operated by a working medium in a circuit, driving a compressor for the working medium of the circuit and a turbine, operated by working medium taken from that circuit, driving a compressor for the make-up air. Preferably, the turbine in the circuit and the turbine operated by working medium exhausted from the plant, each have a regulating device for adjusting their speeds. A central regulating device may then set the speed of the turbine in the circuit to its desired value and the speed of the turbine working with working medium exhausted from the plant to its desired value in accordance with the load on the plant. It is preferable to influence the central regulating device by the pressure in the circuit at the intake to the circuit turbine and by the pressure of the make-up air at the outlet from the make-up air compressor in such a way that the output value to which the central regulating device is set is continually maintained.

The invention is further explained by reference to the drawings in which.

Figure 1:
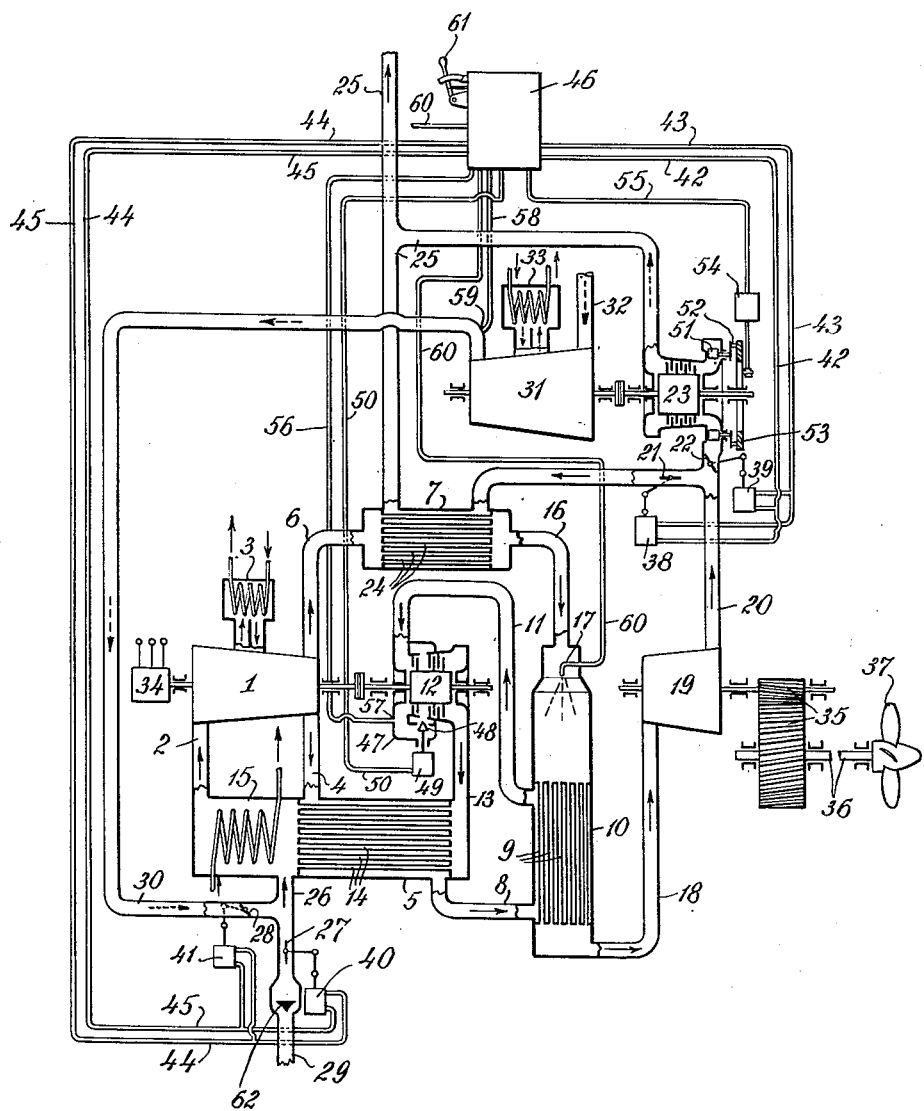
Fig. 1 shows the whole plant in simplified form.

The compressor 1 compresses the working medium flowing in from pipe 2, intermediate cooling during compression being effected in the cooler 3, and delivers it in a compressed state partly through pipe 4 into a heat exchanger 5 and partly through pipe 6 into a heat exchanger 7. The part of the working medium retained in the circuit is pre-heated in heat-exchanger 5 and flows through pipe 8 into the space surrounding the tube system 9 of the gas heater 10. This working medium, thus heated flows through pipe 11 into the turbine 12, and, after expanding in the turbine, passes through pipe 13 into the tube system 14 of the heat exchanger 5. Here, a part of the heat still contained in the expanded working medium is transmitted to the working medium coming through pipe 4 from the compressor 1. A further part of the residual heat is withdrawn from the working medium in a cooler 15. After this recooling, the working medium passes through pipe 2 again into the compressor 1, where the circuit described begins anew.

The part of the working medium withdrawn from the circuit through pipe 6 passes through the heat exchanger 7 and pipe 16 as the combustion air for the burner 17 of the gas heater 10. The products of combustion flow through the tube system 9 and thereby give a part of their heat up to the working medium of the circuit coming from pipe 8. At a diminished temperature, the products of combustion flow through pipe 18 into the useful output turbine 19.

The exhaust gas pipe 20 is fitted with a diverting device, consisting of two valves 21 and 22 by means of which the exhaust gas from the useful output turbine 19 can be directed either to the heat exchanger 7 or to the exhaust gas turbine 23, as desired. The exhaust gas then flows into the exhaust pipe 25, either through the space surrounding the tube system 24 of the heat exchanger 7 or through the exhaust turbine 23.

As make-up for the working medium withdrawn from the circuit, air is introduced into the circuit through pipe 26. This may be air drawn direct from the atmosphere through pipe 29 or air compressed by the compressor 31 through pipe 30, according to the adjustment of the diverting device consisting of the two valves 27 and 28. The compressor 31 receives air in its turn through pipe 32 from the atmosphere. During compression in the compressor 31, intermediate cooling is effected in a cooler 33.

The turbine 12 of the circuit, which is worked with pure air, drives the circuit compressor 1. To the set consisting of the turbine 12 and the compressor 1, an electric motor and generator is coupled, by means of which the plant can be started up, any lack of energy during service made up or superfluous energy led away. The useful output of the turbine 19 is transmitted through the gear 35 and the shaft 36 to the ship's propeller 37, which may be fitted with adjustable blades for reversing and controlling the speed of the vessel. The pre-compressor 31 is driven by the exhaust gas turbine 23.

For controlling the valves 21, 22, 27 and 28, the servomotors 38, 39, 40 and 41 respectively are used. They are connected to a central regulating device 46 through the control pipes 42, 43, 44 and 45, respectively.

The circuit turbine 12 has a bypass pipe 47 for regulating its speed. The quantity flowing through pipe 47 can be adjusted by means of a valve 48. The servomotor 49 of this valve 48 is connected through the control pipe 50 to the central control device 46. An increase in the cross-section of flow through the bypass pipe 47 causes an increase in the quantity of working medium admitted to the turbine 12, so that its speed and therefore its output are increased. On the other hand, by decreasing the cross-sectional area of flow, the speed and the output of the turbine are decreased.

The exhaust turbine 23 has a regulating device for adjusting its speed. The inlet guide blades 51 are rotatable, and are set by cranks 52 on an adjusting ring 53. The adjusting ring 53 is set by means of the servomotor 54. For this purpose, the servomotor is connected through control pipe 55 to the central regulating device 46. A reduction of the cross-sectional area of flow through the guide blades 51 causes an accumulation of the working medium before the turbine. For this reason, an increased quantity of energy is, because of the higher pressure, and in spite of the diminished cross-sectional area of flow, available for the turbine 23, so that its speed is increased. On the other hand, an increase in the cross-sectional area of flow and the consequent fall in pressure, cause a reduction in the output of the turbine.

A central device 46 is influenced through the impulse pipe 56 by the pressure of the circuit at the inlet position 57 to the circuit turbine 12, and through the impulse pipe 58 through the pressure of the make-up air at the position 59 at the outlet from the pre-compressor 31.

The fuel pipe 60 of the burner 17 also passes through the central regulating device 46 for adjusting the quantity of fuel.

The central regulating device 46, according to the position of the hand lever 61, adjusts the pressure level in the circuit at the spot 57 and the pressure of the make-up air at the spot 59, in accordance with the load on the plant.

Figure 2:
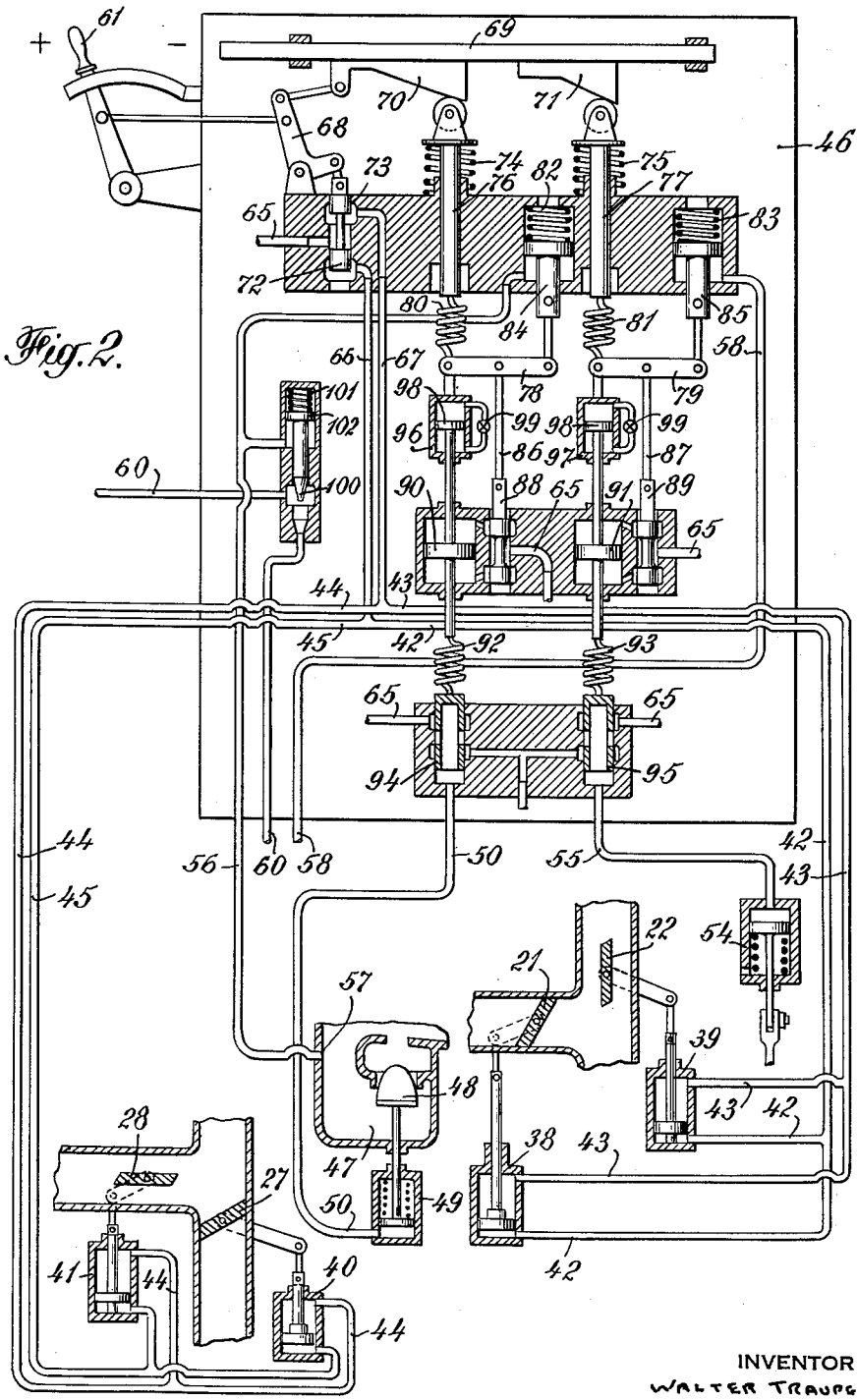
Fig. 2 shows in more detail the central regulating device with some parts of the gas turbine plant connected to it.

By moving the hand lever 61 (Fig. 2) between the extreme positions minus and plus, the crank lever 68 and the bar 69 with the cams 70 and 71 are adjusted from no load position to the maximum overload. Through a pipe system 65, a pressure medium, for instance oil under pressure, is introduced into the regulating device. The crank lever 68 determines the position of the piston valve 72. According to its position, pressure medium is led from the pressure supply pipe 65 through the valve housing 73 either into the control pipe 66 or into the control pipe 67. At the same time, used control liquid flows away from the control pipe which is receiving no fresh pressure liquid.

The cams 70 and 71 determine the position of the plungers 76 and 77 which are pressed upwards by springs 74 and 75 respectively. The floating levers 78 and 79 are held in their position on the one hand by the plungers 76 and 77 through the springs 80 and 81, and on the other hand by the pistons 84 and 85 loaded by means of the springs 82 and 83. By means of the levers 78 and 79, the piston valves 88 and 89 are adjusted through the rods 86 and 87. These valves in their turn control the supply of pressure medium from the system 65 into the cylinders of the servomotor pistons 90 and 91 and the leading away of the used control medium from the cylinders to the outlet. The servomotor pistons in their turn are connected through the springs 92 and 93 with the control valves 94 and 95, and on the other hand, they influence the position of the floating levers 78 and 79 through the yielding connections 96 and 97 for the return motion of the regulation. The yielding connections have each a piston 98, which can pass liquid through the throttle 99 from one side of the piston to the other.

The fuel pipe 60 has a regulating valve 100, whose position is controlled by means of the piston 102 loaded by the spring 101.

When the lever 61 is in the minus position for no load, the valve 72 takes up its lowest position, and the plungers 76 and 77 are on the contrary in their highest position. In this position, pressure medium can flow from the pressure medium system 65 into the pipe 66 and from there into the pipes 42 and 45. Simultaneously, waste liquid flows from the pipes 43 and 44 through pipe 67 over the freed outlet edge of the valve housing 73 into the drain. The pistons of the servomotor 38, 39, 40 and 41 come into their highest position, so that the valves 22 and 28 are brought into the closed position and the valves 21 and 27 into the opened position.

The exhaust gas from the useful output turbine 19 (Fig. 1) then flows through the space surrounding the tube system 24 of the heat exchanger 7 into the exhaust gas pipe 25. In this way, the combustion air intended for the gas heater 10 is pre-heated, and thereby the residual heat in the working medium flowing away from the plant is to a large extent recuperated. The fresh air introduced into the plant in the circuit to make-up for the quantity of working medium led away, is introduced through the pipes 29 and 26 through the non-return valve 62 and the open valve 27. The plant thus works during no load with a quite low pressure level in the circuit.

If the lever 61 (Fig. 2) is moved toward the left from the no load position at the extreme right, first of all only the plunger 76 is moved downwards, whilst the plunger 77, in accordance with the shape of the cam 71, still remains in its highest position. First of all, the valve 72 does not move over the control edges, so that the valves 21, 22 and 27, 28 remain unmoved in their position. On the other hand, by the downwards motion of the plunger 76, first of all the spring 80 is put into compression. In this way, the cylinder of the yielding connection 96 is pressed downwards, so that liquid is passed through the throttle 99. This motion is also followed by the rod 86 and the valve 88. Liquid can then come under the piston 90 from the supply system 65. In this way, the piston 90 is raised and the spring 92 released. Consequently, a correspondingly lower control pressure is adjusted by the releasing of the spring 92, so that the piston of the servomotor 49 and the through-flow member 48 of the bypass pipe 47 are pressed downwards by the servomotor spring. The cross-sectional area of flow of the bypass pipe 47 is therefore increased, so that the speed in the output of the circuit turbine 12 (Fig. 1) is also increased. In this way, the speed of the circuit compressor 1 is raised and the pressure level in the circuit also. This increase in pressure is transmitted from the position 57 at the inlet into the circuit turbine through the pipe 56 to the piston and rod 84, which is consequently pressed upwards against the force of the spring 82. The regulating process comes to rest when with increased pressure in the circuit and therefore in the control pipe 56 and under the piston 84 and with total releasing of the spring 80 of the floating lever 78, a position is obtained in which the control valve 88 comes into the middle position, where control liquid is not led to either side of the servomotor piston 90. This position of rest of the regulating device is consequently only reached when the pressure adjusted in the circuit depends definitely on the position of the lever 61.

Corresponding to the pressure in the control pipe 56, which depends on the position of the lever 61 and on the output of the plant, the piston 102 of the fuel regulating valve 100 is raised against the force of the spring 101, so that the quantity of fuel introduced to the gas heater 10 is increased. The output of the whole plant can thus be raised to the highest required for normal cruising speed, for which the blade shape and the cross-sectional areas of flow of the machines are so chosen, that the highest possible efficiency is ensured.

If the output has to be increased beyond that required for cruising speed, the lever 61 is again moved in the direction towards the plus position. At a definite position, valve 72 diverts the supply of pressure medium from pipe 66 to pipe 67. The piston of the servomotors 38, 39, 40, 41 come into the position shown in the drawing, whereby valves 22 and 28 are opened and valves 21 and 27 closed. The plant then changes over from atmospheric working into working with precompression. The exhaust gases from the useful output turbine 19 (Fig. 1) flow through the exhaust gas turbine 23 into the exhaust pipe 25. The exhaust gas turbine drives the compressor 31, which draws air through the pipe 32 from atmosphere and compresses it to a greater or lesser degree according to the power requirements, after which it is passed through pipe 30 into the circuit. The pressure in the circuit is thus again raised and the value which it should have is set according to the displacement of the cam 70 (Fig. 2), as already described.

The cam 71 arrives at a position at which the plunger 77 is pressed downwards and the pressure of the make-up air is adjusted and determined. The spring 81 is put into compression, and corresponding to the yielding of the device 97, the rod 87 and the valve 89 are pressed downwards by means of the floating lever 79. The servomotor piston 91 then moves upwards and the spring 93 is released from compression. In this way, the control pressure of pipe 55 is lowered and the piston of the servomotor 54 is raised upwards by the spring action on it. The blades 51 by adjustment of the ring 53 (Fig. 1) are then set in such a way that the free cross-section through them is diminished. This causes an accumulation of the working medium before the guide apparatus, whereby the speed in the guide blades is increased, thus raising the output of the turbine. Because of this, the speed and therefore also the precompressing of the working medium brought about by the compressor 31, are increased. The increased pressure is transmitted from the spot 59 (Fig. 1) through pipe 58 to below the piston and rod 85 (Fig. 2), which is pressed upwards against the spring 83. The regulating operation then comes to rest when with the new position of the piston 85 and released spring 81 of the floating lever 79, a position is taken up in which the valve 89 stands in the middle position, where no pressure medium is admitted to one side or the other of the piston 91. Equilibrium is only reached when the pressure of the make-up air at the spot 59 has the value which is determined by the position of the lever 61. Any deviation from this value will be compensated by a new regulating operation.

In the extreme left hand position of the lever 61, the pressure in the circuit and also the pressure of the make-up air have their highest values. The whole plant then works with maximum output for maximum speed of the vessel, which may be a multiple of the normal output for cruising speed, for instance eight times as much. The highest pressure in the circuit at the outlet of compressor 1 in that case is eight times the pressure at this spot when cruising, whilst the highest pressure of the make-up air is only six times its value when cruising. Further, circuit pressure at cruising speed is about three times make-up pressure (or 3 atmospheres absolute, circa). Necessarily, then circuit pressure at maximum speed, is four times higher than the simultaneous pressure of the make-up air. The pressures thus change, not in proportion to the output but rather following the shape of the cams 70 and 71. Thus the ratio of the pressure in the circuit to the pressure of the make-up air is increased as the output increases. Therefore, efficiency at all outputs will still be reasonable and optimum economy of operation under naval service conditions obtained.

I claim:

1. A gas turbine plant comprising a working medium circuit, a turbine driven by working medium in the circuit, a speed regulating device controlling the speed of said turbine, a compressor compressing working medium in the circuit driven by said turbine, a second turbine driven by working medium withdrawn from the circuit, a speed regulating device controlling the speed of said second turbine, a second compressor compressing make-up for the circuit driven by said second turbine, and a central regulating device comprising control means adjustable in accordance with the load on the plant and subordinate control means responsive to said first control means governing each of said turbine speed regulating devices.

2. The combination of claim 1 in which the subordinate control means governing the first turbine speed regulating device is also responsive to the circuit pressure at the intake to the first turbine and the subordinate control means governing the second turbine speed regulating device is also responsive to the make-up pressure at the outlet from the second compressor.

3. The combination of claim 1 in which the subordinate control means comprise a fluid pressure system, valves therein and servomotors.

4. The combination of claim 1 in which the first control means comprises a system of levers and cams.

5. The combination of claim 1 in which additional subordinate control means responsive to the first control means are provided to govern the fuel supply of the plant.

6. A semi-circuit gas turbine plant characterized by a device for regulating the circuit compressor and a device for regulating the make-up compressor by means of which devices the outputs of the two compressors can be so controlled that the ratio of the pressure existing in the circuit between compressor and turbine to the pressure of the make-up air delivered to the circuit is made greater with increasing plant output and less with diminishing plant output.

7. The plant of claim 6 further characterized in that the device for regulating the circuit compressor and the device for regulating the make-up compressor each include a device for altering the flow of working medium through the turbine driving their respective compressors.

WALTER TRAUPEL.

REFERENCES CITED

The following references are of record in the file of this patent:

UNITED STATES PATENTS

| Number | Name | Date |
|---|---|---|
| 2,115,112 | Lysholm | Apr. 26, 1938 |
| 2,137,139 | Keller | Nov. 15, 1938 |
| 2,172,910 | Keller | Sept. 12, 1939 |
| 2,268,270 | Traupel | Dec. 30, 1941 |